(12) United States Patent
Smith et al.

(10) Patent No.: US 7,241,820 B2
(45) Date of Patent: Jul. 10, 2007

(54) ABSORBING STRUCTURE HAVING IMPROVED BLOCKING PROPERTIES

(75) Inventors: Scott Smith, Greensboro, NC (US); Bernfried Messner, Greensboro, NC (US); Markus Frank, Tonisvorst (DE)

(73) Assignee: Stockhausen GmbH, Krefeld (DE)

( * ) Notice: Subject to any disclaimer, the term of this patent is extended or adjusted under 35 U.S.C. 154(b) by 248 days.

(21) Appl. No.: 10/427,054

(22) Filed: Apr. 30, 2003

(65) Prior Publication Data

US 2004/0220350 A1    Nov. 4, 2004

Related U.S. Application Data

(63) Continuation of application No. PCT/EP01/12506, filed on Oct. 30, 2001.

(30) Foreign Application Priority Data

Oct. 30, 2000   (DE) ................... 100 53 858

(51) Int. Cl.
   *C08F 8/30*        (2006.01)
(52) U.S. Cl. .............. 524/32; 525/123; 525/329.9; 525/384
(58) Field of Classification Search ........... 524/32; 525/123, 384
   See application file for complete search history.

(56) References Cited

U.S. PATENT DOCUMENTS

| | | |
|---|---|---|
| RE26,151 E | 1/1967 | Duncan et al. |
| 3,489,148 A | 1/1970 | Duncan et al. |
| 3,592,194 A | 7/1971 | Duncan |
| 3,860,003 A | 1/1975 | Buell |
| 4,076,663 A | 2/1978 | Masuda et al. |
| 4,286,082 A | 8/1981 | Tsubakimoto et al. |
| 4,703,132 A | 10/1987 | Marciano-Agostinelli et al. |
| 4,734,478 A | 3/1988 | Tsubakimoto et al. |
| RE32,649 E | 4/1988 | Brandt et al. |
| 5,061,295 A | 10/1991 | Hickory et al. |
| 5,190,533 A | 3/1993 | Blackburn |
| 5,258,429 A | 11/1993 | Kniewske et al. |
| 5,300,192 A | 4/1994 | Hansen et al. |
| 5,369,148 A | 11/1994 | Takahashi et al. |
| 5,409,771 A | 4/1995 | Dahmen et al. |
| 5,731,365 A | 3/1998 | Engelhardt et al. |
| 5,797,893 A | 8/1998 | Wada et al. |
| 5,866,242 A | 2/1999 | Tan et al. |
| 5,916,670 A | 6/1999 | Tan et al. |

FOREIGN PATENT DOCUMENTS

| | | |
|---|---|---|
| CN | 11 05 925 A | 8/1995 |
| DE | 27 06 135 A1 | 2/1977 |
| DE | 35 03 458 A1 | 2/1985 |
| DE | 40 20 780 C1 | 6/1990 |
| DE | 41 38 408 A1 | 11/1991 |
| DE | 42 44 548 A1 | 12/1992 |
| DE | 43 33 056 A1 | 9/1993 |
| DE | 44 18 818 A1 | 5/1994 |
| DE | 195 43 366 A1 | 11/1995 |
| DE | 195 43 368 A1 | 11/1995 |
| DE | 198 13 443 A1 | 3/1998 |
| DE | 199 09 838 A1 | 3/1999 |
| EP | 0 644 224 | 3/1995 |
| EP | 0 644 224 A1 | 3/1995 |
| EP | 0 703 265 A1 | 6/1995 |
| EP | 0 761 241 | 3/1997 |
| EP | 0 835 885 A2 | 4/1998 |
| EP | 1 072 630 | 1/2001 |
| JP | 9-136966 | 5/1997 |
| JP | 11-080248 | 3/1999 |
| JP | 11-286611 | 10/1999 |
| JP | 11-349625 | 12/1999 |
| JP | 2000-093792 | 4/2000 |
| JP | 2000-342963 | 12/2000 |
| WO | WO 93/05080 | 3/1993 |
| WO | WO 99/34843 | 7/1999 |
| WO | WO 00/62825 | 10/2000 |

*Primary Examiner*—Bernard Lipman
(74) *Attorney, Agent, or Firm*—Smith Moore LLP

(57) ABSTRACT

A process for producing an absorbing polymer structure (Pa) including the steps of obtaining a treated absorbing polymer structure (Pb) by increasing the absorption under load at a load of 0.3 or 0.9 psi (AUL) compared to an untreated absorbing polymer structure (Pu) by a first treatment of an outer region of the untreated absorbing polymer structure (Pu) and reducing the AUL compared to the treated polymer structure (Pb) by a second treatment of an outer region of the treated absorbing polymer structure (Pb). Such absorbing polymer structure (Pa) may be used in a composite and may be used in foams, moulded articles, fibers, sheets, films, cables, sealing materials, liquid-absorbing hygiene articles, carriers for plant growth-regulating and fungal growth-regulating agents, packaging materials and soil additives or building materials.

21 Claims, No Drawings

ABSORBING STRUCTURE HAVING IMPROVED BLOCKING PROPERTIES

This application is a continuation of International Application No. PCT/EP01/12506, internationally filed Oct. 30, 2001.

BACKGROUND OF THE INVENTION

The present invention relates to a process for the production of an absorbing polymer structure, an absorbing polymer structure obtainable by this process, an absorbing polymer structure, a composite, a process for the production of a composite, a composite obtainable according to this process, foams, moulded articles, fibers, sheets, films, cables, sealing materials, liquid-absorbing hygiene articles, carriers for plant growth-regulating and fungal growth-regulating agents, packaging materials and soil additives or building materials containing these absorbing polymer structures or this composite, as well as the use of this absorbing polymer structure or this composite in foams, moulded articles, fibers, sheets, films, cables, sealing materials, liquid-absorbing hygiene articles, carriers for plant growth-regulating and fungal growth-regulating agents, packaging materials, soil additives or building materials.

Water-absorbing polymers are used in modem cable production in order to protect these cables against the penetration of water and the damage resulting therefrom. Such water damage occurs in particular if the outer sheathing or the structure of the cables is damaged by mechanical action or by excessive bending. The water can penetrate through the openings that are thereby formed and, if no water-absorbing polymer is present, the structure of the cables is permanently affected to such an extent that the functional integrity of the cables is no longer guaranteed. Another possible way in which water can penetrate is if the cables are repeatedly exposed to water vapour, which penetrates through the insulation or the outer sheathing and is then deposited as condensation in the internal structure of the cables. Such condensation leads particularly in the case of electrical cables to the occurrence of leakage currents that adversely affect the functional integrity of the electrical cable or to electrical short circuits that destroy the overall structure of the cables.

In conjunction with the use of water-absorbing polymers in cable manufacture it is preferred that these water-absorbing polymers have good blocking properties in addition to a good gel stability.

Good blocking properties exist when the penetration of a test liquid through the absorbing polymer is as low as possible. Accordingly the good blocking properties mean that the penetrating water can be retained as long as possible in the absorbing polymer and in this way the penetration of the water to the further part of the cable structure is delayed.

Also, these water-absorbing polymers require a high absorbency for penetrating liquids and must swell rapidly in order to fill effectively and completely the cavities in the cable when moisture penetrates. Small, porous particles swell rapidly but are not sufficiently stable. Similarly, although a low crosslinking density leads to a high absorbency, the stability is in turn reduced.

Examples of water-absorbing polymers used up to now include crosslinked, partially neutralized polyacrylates, crosslinked, neutralized graft polymers of acrylic acid on starch, saponified, crosslinked copolymers of vinyl acetate and acrylic acid esters, and neutralized crosslinked copolymers of isobutylene and maleic anhydride.

U.S. Re Pat. No. 32,649 discloses a conventional water-absorbing polymer which, although it exhibits good blocking properties, nevertheless has a gel stability that is not satisfactory for cable manufacture.

DE 40 20 780 furthermore discloses a water-absorbing polymer which, in contrast to the aforementioned conventional water-absorbing polymer, has been modified by a post-crosslinking step following the synthesis of the conventional polymer. Although this post-crosslinked polymer exhibits a gel stability that is acceptable for cable manufacture, nevertheless the blocking properties of this post-crosslinked polymer are not suitable for cable manufacture.

The object of the invention is in general to overcome the disadvantages inherent in the prior art.

A further object according to the invention is to provide a water-absorbing polymer that is suitable for cable manufacture.

In addition another object according to the invention is to provide a water-absorbing polymer that exhibits blocking properties suitable for cable manufacture as well as a stability that is likewise appropriate for cable manufacture.

Yet a further object of the invention is to provide a water-absorbing polymer that is suitable, apart from cable manufacture, also for use in liquid-absorbing hygiene articles such as sanitary towels or diapers.

DETAILED DESCRIPTION OF THE INVENTION

The above objects are achieved by a process for the production of an absorbing polymer structure (Pa), comprising the following steps:

increasing the absorbency under load at a load of 0.3 or 0.9 psi, preferably at a load of 0.3 and 0.9 psi (AUL) compared to an untreated absorbing polymer structure (Pu) by a first treatment of an outer region of the untreated absorbing polymer structure (Pu), a treated absorbing polymer structure (Pb) being obtained;

reducing the AUL compared to the treated absorbing polymer structure (Pb) by a further treatment of an outer region of the treated absorbing polymer structure (Pb).

Absorbing polymer structures (Pa) according to the invention include fibers, foams and particles, wherein fibers and particles are preferred and particles are particularly preferred.

Preferred absorbing polymer fibers according to the invention are dimensioned so that they can be incorporated in or as yams for textiles and also directly into textiles. It is preferred according to the invention for the absorbing polymer fibers to have a length in the range from 1 to 500 mm, preferably 2 to 500 mm and particularly preferably 5 to 100 mm, and a diameter in the range from 1 to 200 denier, preferably 3 to 100 denier and particularly preferably 5 to 60 denier.

Preferred absorbing polymer particles according to the invention have a mean particle size according to ERT 420.1-99 in the range from 10 to 10000 μm, preferably in the range from 50 to 5000 μm and particularly preferably in the range from 100 to 1000 μm.

It is furthermore preferred according to the invention that, due to the further treatment, the retention capacity according to ERT 441.1-99 (CRC) is reduced, less in percentage terms referred to the value before the second treatment than the drop in the value of the AUL.

The untreated polymer structure (Pu) is preferably based on (α1) 0.1 to 99.999 wt. %, preferably 20 to 98.99 wt. % and particularly preferably 30 to 98.95 wt. % of polymerized, ethylenically unsaturated, acid group-containing monomers or their salts, or polymerized, ethylenically unsaturated monomers containing a protonated or quaternated nitrogen atom, or their mixtures, wherein mixtures containing at least ethylenically unsaturated, acid group-containing monomers, preferably acrylic acid, are particularly preferred, (α2) 0 to 70 wt. %, preferably 1 to 60 wt. % and particularly preferably 1 to 40 wt. % of polymerized, ethylenically unsaturated monomers copolymerizable with (α1), (α3) 0.001 to 10 wt. %, preferably 0.01 to 7 wt. % and particularly preferably 0.05 to 5 wt. % of one or more crosslinking agents, as well as (α4) 0 to 20 wt. %, preferably 0.01 to 20 wt. %, particularly preferably 0.1 to 15 wt. % and most particularly preferably 0.5 to 5 wt. %, of water-soluble polymers, as well as (α5) 0 to 20 wt. %, preferably 0.01 to 7 wt. % and particularly preferably 0.05 to 5 wt. % of one or more auxiliary substances, the sum total of the amounts by weight of (α1) to (α5) being 100 wt. %.

Preferred monoethylenically unsaturated, acid-group containing monomers (α1) are acrylic acid, methacrylic acid, ethacrylic acid, α-chloroacrylic acid, α-cyanoacrylic acid, β-methacrylic acid (crotonic acid), α-phenylacrylic acid, β-acryloxypropionic acid, sorbic acid, α-chlorosorbic acid, 2'-methylisocrotonic acid, cinnamic acid, p-chloro-cinnamic acid, β-stearyl acid, itaconic acid, citraconic acid, mesaconic acid, glutaconic acid, aconitic acid, maleic acid, fumaric acid, tricarboxyethylene and maleic anhydride, acrylic acid as well as methacrylic acid being particularly preferred, and acrylic acid being most particularly preferred.

In addition to these carboxylate group-containing monomers, ethylenically unsaturated sulfonic acid monomers or ethylenically unsaturated phosphonic acid monomers are moreover preferred as monoethylenically unsaturated, acid group-containing monomers (α1).

As ethylenically unsaturated sulfonic acid monomers, allylsulfonic acid or aliphatic or aromatic vinylsulfonic acids or acrylic or methacrylic sulfonic acids are preferred. As aliphatic or aromatic vinylsulfonic acids, vinylsulfonic acid, 4-vinylbenzylsulfonic acid, vinyl-toluenesulfonic acid and styrenesulfonic acid are preferred. As acrylsulfonic acids or methacrylsulfonic acids, sulfoethyl (meth)acrylate, sulfopropyl (meth)-acrylate and 2-hydroxy-3-methacryloxypropylsulfonic acid are preferred. As (meth)acrylamidoalkylsulfonic acid, 2-acrylamido-2-methylpropanesulfonic acid is preferred.

Also preferred are ethylenically unsaturated phosphonic acid monomers such as vinylphosphonic acid, allylphosphonic acid, vinylbenzylphosphonic acid, (meth)acrylamidoalkyl-phosphonic acids, acrylamidoalkyldiphosphonic acids, phosphonomethylated vinylamines, and (meth)acrylphosphonic acid derivatives.

As ethylenically unsaturated monomers (α1) containing a protonated nitrogen atom, there are particularly preferred dialkylaminoalkyl (meth)acrylates in protonated form, for example dimethylaminoethyl (meth)acrylate hydrochloride or dimethylaminoethyl (meth)acrylate hydrosulfate, as well as dialkylaminoalkyl (meth)acrylamides in protonated form, for example dimethylaminoethyl (meth)acrylamide hydrochloride, dimethylaminopropyl (meth)acrylamide hydrochloride, dimethylaminopropyl (meth)acrylamide hydrosulfate, or dimethylaminoethyl (meth)acrylamide hydrosulfate.

As ethylenically unsaturated monomers (α1) containing a quaternated nitrogen atom, there are preferred dialkylammoniumalkyl (meth)acrylates in quaternated form, for example trimethylammoniumethyl (meth)acrylate methosulfate or dimethylethylammoniummethyl (meth)acrylate ethosulfate, as well as (meth)acrylamidoalkyldialkylamines in quaternated form, for example (meth)acrylamidopropyltrimethylammonium chloride, trimethylammoniumethyl (meth)acrylate chloride or (meth)acrylamidopropyltrimethyl-ammonium sulfate.

The monoethylenically unsaturated, acid group-containing monomers (α1) may be partially or completely neutralized, preferably partially neutralized. Preferably the monoethylenically unsaturated, acid group-containing monomers are neutralized to an extent of at least 25 mole %, particularly preferably at least 50 mole %, and most particularly preferably 50–90 mole %. The neutralization of the monomers (α1) may be carried out before or after the polymerization. Furthermore the neutralization may be carried out with alkali metal hydroxides, alkaline earth metal hydroxides, ammonia, as well as carbonates and bicarbonates. In addition any further base may be used that forms a water-soluble salt with the acid. A mixed neutralization with various bases is also possible. Neutralization with ammonia or with alkali metal hydroxides is preferred, and neutralization with sodium hydroxide or with ammonia is particularly preferred.

Furthermore in a polymer structure the free acid groups may predominate, so that this polymer structure has a pH value lying in the acid range. This acidic water-absorbing polymer structure may be at least partially neutralized by a polymer containing free basic groups, preferably amine groups, that is basic compared to the acidic polymer. These polymers are termed "mixed-bed ion-exchange absorbent polymers" (MBIEA polymers) in the literature and are disclosed in, inter alia, WO 99/34843. The disclosure of WO 99/34843 is introduced here by way of reference and is thus part of the disclosure. As a rule MBIEA polymers represent a composition that contain on the one hand basic polymers that are able to exchange anions, and on the other hand contain a polymer that is acidic compared to the basic polymer and that is able to exchange cations. The basic polymer contains basic groups and is typically obtained by the polymerization of monomers that carry basic groups or groups that can be converted into basic groups. These monomers are in particular those that contain primary, secondary or tertiary amines or the corresponding phosphines or at least two of the aforementioned functional groups. This group of monomers includes in particular ethyleneamine, allylamine, diallylamine, 4-aminobutene, alkyloxycyclene, vinylformamide, 5-aminopentene, carbodiimide, formaldacin, melanin and the like, as well as their secondary or tertiary amine derivatives.

It is preferred according to the invention that the untreated polymer structure (Pu) consists in an amount of at least 50 wt. %, preferably at least 70 wt. % and particularly preferably at least 90 wt. %, of carboxylate group-containing monomers. It is particularly preferred according to the invention that the untreated polymer structure (Pu) consists in an amount of at least 50 wt. % and preferably at least 70 wt. % of acrylic acid that is preferably neutralized in an amount of at least 20 mole %, particularly preferably at least 50 mole %.

Acrylamides and methacrylamides are preferred as monoethylenically unsaturated monomers (α2) copolymerizable with (α1).

Possible (meth)acrylamides are, in addition to acrylamide and methacrylamide, also alkyl-substituted (meth)acrylamides or aminoalkyl-substituted derivatives of (meth)acrylamide, such as N-methylol (meth)acrylamide, N,N-dimethylamino (meth)acrylamide, dimethyl (meth)acrylamide or diethyl (meth)acrylamide. Possible vinyl amides are for example N-vinyl amides, N-vinyl formamides, N-vinyl acetamides, N-vinyl-N-methylacetamides, N-vinyl-N-methylformamides, and vinylpyrrolidone.

Among these monomers acrylamide is particularly preferred. Furthermore, monomers dispersible in water are preferred as monoethylenically unsaturated monomers ($\alpha 2$) copolymerizable with ($\alpha 1$). As monomers dispersible in water there are preferred acrylic acid esters and methacrylic acid esters, such as methyl (meth)acrylate, ethyl (meth)acrylate, propyl (meth)acrylate or butyl (meth)acrylate, as well as vinyl acetate, styrene and isobutylene.

Preferred crosslinking agents ($\alpha 3$) according to the invention are compounds that contain at least two ethylenically unsaturated groups within a molecule (class I crosslinking agents), compounds that contain at least two functional groups that may react with functional groups of the monomers ($\alpha 1$) or ($\alpha 2$) in a condensation reaction (=condensation crosslinking agents), in an addition reaction or in a ring-opening reaction (class II crosslinking agents), compounds that contain at least one ethylenically unsaturated group and at least one functional group that can react with functional groups of the monomers ($\alpha 1$) or ($\alpha 2$) in a condensation reaction, in an addition reaction or in a ring-opening reaction (class III crosslinking agents), or polyvalent metal cations (class IV crosslinking agents). In this connection a crosslinking of the polymers by the free-radical polymerization of the ethylenically unsaturated groups of the crosslinking molecule with the monoethylenically unsaturated monomers ($\alpha 1$) or ($\alpha 2$) is achieved by the compounds of the class I crosslinking agents, whereas with the compounds of the class II crosslinking agents and the polyvalent metal cations of the class IV crosslinking agents, a crosslinking of the polymers is achieved by a condensation reaction of the functional groups (class II crosslinking agents) and/or by electrostatic interaction of the polyvalent metal cation (class IV crosslinking agents) with the functional groups of the monomers ($\alpha 1$) or ($\alpha 2$). With the compounds of the class III crosslinking agents a crosslinking of the polymer is accordingly achieved both by free-radical polymerization of the ethylenically unsaturated group as well as by a condensation reaction between the functional group of the crosslinking agent and the functional groups of the monomers ($\alpha 1$) or ($\alpha 2$).

Preferred compounds of the class I crosslinking agents are poly(meth)acrylic acid esters or poly(meth)acrylamides, which may be obtained for example by reacting a polyol such as for example ethylene glycol, propylene glycol, trimethylolpropane, 1,6-hexanediol, glycerol, pentaerythritol, polyethylene glycol or polypropylene glycol, of an aminoalcohol, a polyalkylene-polyamine, for example diethylenetriamine or triethylenetetra-amine, or an alkoxylated polyol, with acrylic acid or methacrylic acid. Also preferred as compounds of the class I crosslinking agents are polyvinyl compounds, poly(meth)allyl compounds, (meth)acrylic acid esters of a monovinyl compound or (meth)acrylic acid esters of a mono(meth)allyl compound, preferably mono (meth)allyl compounds of a polyol or of an aminoalcohol. In this connection reference may be made to DE 195 43 366 and DE 195 43 368. The disclosures are introduced by way of reference and are thus part of the disclosure.

As compounds of class I crosslinking agents, the following may be mentioned by way of example: alkenyl di(meth)-acrylates, for example ethylene glycol di(meth)acrylate, 1,3-propylene glycol di(meth)acrylate, 1,4-butylene glycol di(meth)acrylate, 1,3-butylene glycol di(meth)acrylate, 1,6-hexanediol di(meth)acrylate, 1,10-decanediol di(meth)-acrylate, 1,12-dodecanediol di(meth)acrylate, 1,18-octa-decanediol di(meth)acrylate, cyclopentanediol di(meth)-acrylate, neopentyl glycol di(meth)acrylate, methylene di(meth)acrylate or pentaerythritol di(meth)acrylate, alkenyl di(meth)acrylamides, for example N-methyl di(meth)acrylamide, N,N'-3-methylbutyl-idenebis(meth)-acrylamide, N,N'(1,2-dihydroxyethylene)bis(meth)acrylamide, N,N'-hexamethylenebis(meth)-acrylamide or N,N'-methylenebis (meth)acrylamide, polyalkoxy di(meth)acrylates, for example diethylene glycol di(meth)acrylate, triethylene glycol di(meth)acrylate, tetraethylene glycol di(meth)-acrylate, dipropylene glycol di(meth)acrylate, tripropylene glycol di(meth)acrylate or tetrapropylene glycol di(meth)-acrylate, bisphenol A di(meth)acrylate, ethoxylated bisphenol A di(meth)acrylate, benzylidyne di(meth)acrylate, 1,3-di (meth)acryloyloxy-propanol-2, hydroquinone di(meth)-acrylate, di(meth)acrylate esters of trimethylolpropane oxyalkylated, preferably ethoxylated, with preferably 1 to 30 moles of alkylene oxide per hydroxyl group, thioethylene glycol di(meth)acrylate, thiopropylene glycol di(meth)-acrylate, thiopolyethylene glycol di(meth)acrylate, thiopolypropylene glycol di(meth)acrylate, divinyl ethers, for example 1,4-butanediol vinyl ether, divinyl esters, for example divinyl adipate, alkanedienes, for example butadiene or 1,6-hexadiene, divinylbenzene, di(meth)allyl compounds, for example di(meth)allyl phthalate or di(meth)allyl succinate, homopolymers and copolymers of di(meth)allyldimethyl ammonium chloride and homopolymers and copolymers of diethyl(meth)allylaminomethyl(meth)-acrylate ammonium chloride, vinyl(meth)acrylic compounds, for example vinyl(meth)acrylate, (meth)allyl(meth)acrylic compounds, for example (meth)allyl(meth)acrylate, (meth)allyl (meth)acrylate ethoxylated with 1 to 30 moles of ethylene oxide per hydroxyl group, di(meth)allyl esters of polycarboxylic acids, for example di(meth)allyl maleate, di(meth) allyl fumarate, di(meth)allyl succinate or di(meth)allyl terephthalate, compounds with 3 or more ethylenically unsaturated, free-radical polymerizable groups such as for example glycerol tri(meth)acrylate, (meth)acrylate esters of glycerol oxyethylated with preferably 1 to 30 moles of ethylene oxide per hydroxyl group, trimethylolpropane tri (meth)acrylate, tri(meth)-acrylate esters of trimethylolpropane oxyalkylated, preferably ethoxylated, with preferably 1 to 30 moles of alkylene oxide per hydroxyl group, trimethacrylamide, (meth)allylidene di(meth)acrylate, 3-allyloxy-1,2-propanediol di(meth)acrylate, tri(meth)allyl cyanurate, tri(meth)allyl isocyanurate, pentaerythritol tetra(meth)-acrylate, pentaerythritol tri(meth)acrylate, (meth)acrylic acid esters of pentaerythritol oxyethylated with preferably 1 to 30 moles of ethylene oxide per hydroxyl group, tris(2-hydroxyethyl)isocyanurate tri(meth)acrylate, trivinyl trimellitate, tri(meth)allylamine, di(meth)allylalkyl-amines, for example di(meth)allylmethylamine, tri(meth)-allyl phosphate, tetra(meth)allylethylenediamine, poly(meth)allyl esters, tetra(meth)allyloxyethane or tetra(meth)allyl ammonium halides.

As compounds of class II crosslinking agents, those are preferred that contain at least two functional groups that can react in a condensation reaction (=condensation crosslinking agents), in an addition reaction or in a ring-opening reaction with the functional groups of the monomers ($\alpha 1$) or ($\alpha 2$), preferably with acidic groups of the monomers ($\alpha 1$). These functional groups of the compounds of class II crosslinking agents are preferably alcohol, amine, aldehyde, glycidyl, isocyanate, carbonate or epichloro groups.

As compounds of class II crosslinking agents, the following may be mentioned by way of example: polyols, for example ethylene glycol, polyethylene glycols such as diethylene glycol, triethylene glycol and tetraethylene glycol, propylene glycol, polypropylene glycols such as dipropylene glycol, tripropylene glycol or tetrapropylene glycol, 1,3-butanediol, 1,4-butanediol, 1,5-pentanediol, 2,4-pentanediol, 1,6-hexanediol, 2,5-hexanediol, glycerol, polyglycerol, trimethylolpropane, polyoxypropylene, oxyethylene/oxypropylene block copolymers, sorbitan fatty acid esters, polyoxyethylene sorbitan fatty acid esters, pentaerythritol, polyvinyl alcohol and sorbitol, aminoalcohols, for example ethanolamine, diethanolamine, triethanolamine or propanolamine, polyamine compounds, for example ethylenediamine, diethylenetriamine, triethylene-tetramine, tetraethylenepentamine or pentaethylene-hexamine, polyglycidyl ether compounds such as ethylene glycol diglycidyl ether, polyethylene glycol diglycidyl ether, glycerol diglycidyl ether, glycerol polyglycidyl ether, pentaerythritol polyglycidyl ether, propylene glycol diglycidyl ether, polypropylene glycol diglycidyl ether, neopentyl glycol diglycidyl ether, hexanediol glycidyl ether, trimethylolpropane polyglycidyl ether, sorbitol polyglycidyl ether, phthalic acid diglycidyl ester, adipic acid diglycidyl ether, 1,4-phenylene-bis(2-oxazoline), glycidol, polyisocyanates, preferably diisocyanates such as 2,4-toluene diisocyanate and hexamethylene diisocyanate, polyaziridine compounds such as 2,2-bishydroxymethyl-butanol-tris[3-(1-aziridinyl)propionate], 1,6-hexamethylene-diethylene urea and diphenylmethane-bis-4,4'-N,N'-diethylene urea, halogen epoxides, for example epichlorohydrin, epibromohydrin and α-methylepichlorohydrin, alkylene carbonates such as 1,3-dioxolan-2-one (ethylene carbonate), 4-methyl-1,3-dioxolan-2-one (propylene carbonate), 4,5-dimethyl-1,3-dioxolan-2-one, 4,4-dimethyl-1,3-dioxolan-2-one, 4-ethyl-1,3-dioxolan-2-one, 4-hydroxymethyl-1,3-dioxolan-2-one, 1,3-dioxan-2-one, 4-methyl-1,3-dioxan-2-one, 4,6-dimethyl-1,3-dioxan-2-one, 1,3-dioxolan-2-one, poly-1,3-dioxolan-2-one, polyquaternary amines such as condensation products of dimethylamines and epichloro-hydrin. Also preferred as compounds of class II crosslinking agents are polyoxazolines such as 1,2-ethylenebisoxazoline, crosslinking agents with silane groups such as γ-glycidoxypropyltrimethoxysilane and γ-aminopropyltrimethoxysilane, oxazolidinones such as 2-oxazolidinone, bis- and poly-2-oxazolidinones, and diglycol silicates.

Preferred as compounds of class III are hydroxyl group-containing or amino group-containing esters of (meth)acrylic acid, such as for example 2-hydroxyethyl (meth)acrylate, as well as hydroxyl group-containing or amino group-containing (meth)acrylamides, or mono(meth)allyl compounds of diols.

The polyvalent metal cations of class W crosslinking agents are preferably derived from monovalent or polyvalent cations, in particular monovalent cations of alkali metals such as potassium, sodium and lithium, lithium being preferred. Preferred divalent cations are derived from zinc, beryllium, alkaline earth metals such as magnesium, calcium or strontium, magnesium being preferred. Higher valent cations that may also be used according to the invention include cations of aluminium, iron, chromium, manganese, titanium, zirconium and other transition metals, as well as double salts of such cations or mixtures of the aforementioned salts. Aluminium salts and alums and their various hydrates are preferably used, such as for example $AlCl_3 \cdot 6H_2O$, $NaAl(SO_4)_2 \cdot 12H_2O$, $KAl(SO_4)_2 \cdot 12H_2O$ or $Al_2(SO_4)_3 \cdot 14{-}18H_2O$.

$Al_2(SO_4)_3$ and its hydrates are particularly preferably used as crosslinking agents of class IV.

Preferred untreated polymer structures (Pu) are polymer structures that have been crosslinked by crosslinking agents of the following classes or by crosslinking agents of the following combinations of classes: I, II, III, IV, I II, I III, I IV, I II III, I II IV, I III IV, II III IV, II IV or III IV. The above combinations of classes of crosslinking agents in each case represent a preferred embodiment of crosslinking agents of an untreated polymer structure (Pu). Further preferred embodiments of the untreated polymer structures (Pu) are polymer structures that have been crosslinked by any suitable member of the aforementioned crosslinking agents of class I. Among these, water-soluble crosslinking agents are preferred. In this connection N,N'-methylene bisacrylamide, polyethylene glycol di(meth)acrylates, triallylmethyl ammonium chloride, tetraallyl ammonium chloride as well as allylnonaethylene glycol acrylate ethoxylated with 9 moles of ethylene oxide per mole of acrylic acid are particularly preferred.

As water-soluble polymers (α4), the absorbing, untreated polymer structures (Pu) according to the invention may contain polymers or copolymers of the monomers described above, such as polyacrylic acid, partially saponified polyvinyl acetate, polyvinyl alcohol, polyalkylene glycols, starch and starch derivatives, cellulose and cellulose derivatives, as well as other polysaccharides.

As auxiliary substances (α5) there are preferably used extenders, deodorizing agents, surfactants or antioxidants.

In a preferred embodiment of the process according to the invention the untreated absorbing polymer structure (Pu) exhibits at least one of the following properties:
(a) the maximum absorption of a 0.9 wt. % aqueous NaCl solution according to ERT 440.1-99 is in a range from 10 to 1000 ml/g, preferably 15 to 500 ml/g and particularly preferably 20 to 300 ml/g,
(b) the fraction that can be extracted with a 0.9 wt. % aqueous NaCl solution according to ERT 470.1-99 is less than 30 wt. %, preferably less than 20 wt. % and particularly preferably less than 10 wt. %, referred to the untreated absorbing polymer structure,
(c) the swelling time to achieve 80% of the maximum absorption of a 0.9 wt. % aqueous NaCl solution according to ERT 440.1-99 is in the range from 0.01 to 180, preferably 0.01 to 150 and particularly preferably 0.01 to 100 minutes,
(d) the bulk density according to ERT 460.1-99 is in the range from 300 to 1000 g/l, preferably 310 to 800 g/l and particularly preferably 320 to 700 g/l,
(e) the pH value according to ERT 400.1-99 of 1 g of the untreated absorbing polymer structure in 1 liter of water is in the range from 4 to 10, preferably 5 to 9, and particularly preferably 5.5 to 7.5,
(f) the CRC according to ERT 441.1-99 is in the range from 10 to 100 g/g, preferably 15 to 80 g/g, and particularly preferably 20 to 60 g/g,
(g) the gel stability is in the range from 1 to 100 sec. at a first measurement before a warming-up and less than 30 sec. at a second measurement after the warming-up, preferably 2 to 50 sec. at the first measurement before the warming-up and less than 20 sec. at the second measurement after the warming-up, and particularly preferably 5 to 30 sec. at the first measurement before the warming-up and less than 10 sec. at the second measurement after the warming-up,
(h) the penetration is at most 15 cm after 2 hours or at most 20 cm after 24 hours, preferably at most 12 cm after 2 hours or at most 18 cm after 24 hours, and particularly preferably at most 10 cm after 2 hours or at most 16 cm after 24 hours, the penetration after 2 hours and after 24 hours being preferred.

The property combinations of two or more properties of the properties listed above represent in each case preferred embodiments of the process according to the invention. Particularly preferred as embodiments according to the invention are furthermore processes in which the untreated absorbing polymer structure (Pu) exhibits the following properties or property combinations identified by letters or combinations of letter: a, b, c, d, e, f, g, h, ab, abc, abcd, abcde, abcdef, abcdefg, abcdefgh, bc, bcd, bcde, bcdef, bcdefg, bcdefgh, cd, cde, cdef, cdefg, cdefgh, de, def, defg, defgh, ef, efg, efgh, fg, fgh, gh.

The untreated absorbing polymer structure (Pu) can be produced from the aforementioned monomers and crosslinking agents by various polymerization methods. There may be mentioned by way of example in this connection bulk polymerization, which is preferably carried out in kneader reactors such as extruders or by strip polymerization, as well as solution polymerization, spray polymerization, inverse emulsion polymerization and inverse suspension polymerization. Solution polymerization is preferably carried out in water as solvent. Solution polymerization may be carried out continuously or batchwise. A broad range of possible variations as regards reaction parameters such as temperature, the nature and amount of the initiators as well as of the reaction solution, are disclosed in the prior art. Typical processes are described in the following patent specifications: U.S. Pat. No. 4,286,082, DE 27 06 135, U.S. Pat. No. 4,076,663, DE 35 03 458, DE 40 20 780, DE 42 44 548, DE 43 23 001, DE 43 33 056, DE 44 18 818. The disclosures are included here by way of reference and are thus part of the disclosure.

The polymerization initiators may be dissolved or dispersed in a solution of monomers according to the invention. As initiators there may be used all compounds known to the person skilled in the art that decompose to form radicals. Such compounds include in particular peroxides, hydroperoxides, hydrogen peroxide, persulfates, azo compounds as well as the so-called redox catalysts. It is preferred to use water-soluble catalysts. In some cases it is advantageous to use mixtures of various polymerization initiators. Among such mixtures, those consisting of hydrogen peroxide and sodium or potassium peroxodisulfate are preferred, which may be used in any desired quantitative ratio. Suitable organic peroxides are preferably acetylacetone peroxide, methyl ethyl ketone peroxide, tert.-butyl hydroperoxide, cumene hydroperoxide, tert.-amyl perpivate, tert.-butyl perpivate, tert.-butyl perneohexonate, tert.-butyl isobutyrate, tert.-butyl per-2-ethylhexenoate, tert.-butyl perisononanoate, tert.-butyl permaleate, tert.-butyl perbenzoate, tert.-butyl-3,5,5-trimethylhexanoate and amyl perneodecanoate. The following are furthermore preferred as polymerization initiators: azo compounds such as 2,2'-azo-bis-(2-amidinopropane)dihydro-chloride, azo-bis-amidino-propane dihydrochloride, 2,2'-azobis-(N,N-dimethylene) isobutyramidine dihydrochloride, 2-(carbamoylazo) isobutyronitrile and 4,4'-azobis-(4-cyano-valeric acid). The aforementioned compounds are used in conventional amounts, preferably in a range from 0.01 to 5 mole %, more preferably 0.1 to 2 mole %, in each case referred to the amount of the monomers to be polymerized.

The redox catalysts contain as oxidic component at least one of the per compounds listed above, and contain as reducing component preferably ascorbic acid, glucose, sorbose, mannose, ammonium or alkali metal hydrogen sulfite, sulfate, thiosulfate, hyposulfite or sulfide, metal salts such as iron II ions or silver ions or sodium hydroxymethyl sulfoxylate. Preferably ascorbic acid or sodium pyrosulfite is used as reducing component of the redox catalyst. $1 \times 10^{-5}$ to 1 mole % of the reducing component of the redox catalyst and $1 \times 10^{-5}$ to 5 mole % of the oxidizing component of the redox catalyst are used, in each case referred to the amount of monomers used in the polymerization. Instead of the oxidizing component of the redox catalyst, or as a complement thereto, one or more, preferably water-soluble azo compounds may be used.

A redox system consisting of hydrogen peroxide, sodium peroxodisulfate and ascorbic acid is preferably used according to the invention. In general, according to the invention azo compounds are preferred as initiators, azo-bis-amidino-propane dihydrochloride being particularly preferred. As a rule the polymerization is initiated with the initiators in a temperature range from 0° to 90° C.

Another possible way of producing the untreated polymer structures (Pu) is first of all to produce non-crosslinked, in particular linear polymers, preferably by a free-radical method, from the aforementioned monoethylenically unsaturated monomers ($\alpha 1$) and/or ($\alpha 2$), and then react these with reagents ($\alpha 3$) acting as crosslinking agents, preferably those of classes II and IV. This variant is preferably used if the water-absorbing polymers are to be processed first of all in forming and shaping processes, for example into fibers, sheets or other flat structures such as woven fabrics, knitted fabrics, spun fabrics or non-wovens, and crosslinked in this form.

In addition, it is preferred in the process according to the invention that the first treatment is carried out using a chemical crosslinking agent or by thermal crosslinking or radiation crosslinking or at least two of these, in which connection treatment using a chemical crosslinking agent is preferred.

Radiation crosslinking of the untreated polymer structure (Pu) is preferably carried out by exposing the untreated polymer structure (Pu) to IR radiation, UV radiation, X-rays and γ-rays or to radiation in the microwave range.

Thermal crosslinking of the untreated absorbing polymer structure (Pu) is carried out by heating the polymer structure to a temperature in a range from 100° to 300° C., particularly preferably to a temperature in a range from 150° to 250° C.

Chemical crosslinking is carried out by using crosslinking agents generally known to the person skilled in the art. As "post-crosslinking agents", crosslinking agents of classes II and IV described in connection with the crosslinking agents ($\alpha 3$) are preferred.

Among the crosslinking agents of classes II and IV, preferred as "post-crosslinking agents" are diethylene glycol, triethylene glycol, polyethylene glycol, glycerol, polyglycerol, propylene glycol, diethanolamine, triethanolamine, polyoxypropylene, oxyethylene/oxypropylene block copolymers, sorbitan fatty acid esters, polyoxyethylenesorbitan fatty acid esters, trimethylolpropane, pentaerythritol, polyvinyl alcohol, sorbitol, alkylene carbonates such as 1,3-dioxolan-2-one, 4-methyl-1,3-dioxolan-2-one, 4,5-dimethyl-1,3-dioxolan-2-one, 4,4-dimethyl-1,3-dioxolan-2-one, 4-ethyl-1,3-dioxolan-2-one, 4-hydroxymethyl-1,3-dioxolan-2-one, 1,3-dioxan-2-one, 4-methyl-1,3-dioxan-2-one, 4,6-dimethyl-1,3-dioxan-2-one, 1,3-dioxopan-2-one, poly-1,3-dioxolan-2-ones and ethylene glycol diglycidyl ethers, ethylene carbonate being particularly preferred.

The "post-crosslinking agents" are preferably used in an amount in the range from 0.01 to 30 wt. %, preferably 0.1 to 20 wt. % and particularly preferably 0.5 to 10 wt. %, referred to the untreated polymer (Pu). Organic solvents may be added to the mixture in an amount of 0 to 60 wt. %, preferably 0.1 to 40 wt. % and particularly preferably 0.2 to 50 wt. %, referred to the untreated polymer (Pu). As organic solvents there are preferably used lower alcohols such as methanol, ethanol, n-propanol, isopropanol, n-butanol, isobutanol, sec.-butanol and tert.-butanol, ketones such as acetone, methyl ethyl ketone and methyl isobutyl ketone, ethers such as dioxane, tetrahydrofuran and diethyl ether, amides such as N,N-dimethylformamide and N,N-diethylformamide, as well as sulfoxides such as dimethyl sulfoxide.

Furthermore, it is preferred in the process according to the invention that the treated, absorbing polymer structure (Pb) has an inner region surrounded by the outer region and the outer region has a higher degree of crosslinking than the inner region, so that preferably a core-shell structure is formed. Moreover, it is preferred in this connection that the radius of the outer region is less than twice the radius of the inner region. For polymer structures, which are approximately spherical, the radius is determined as the average radius of at least ten of these structures. For polymer structures, which are approximately non-spherical but rode or fiber like, the radius is determined by average radius of the cross sections of at least ten of said non-spherical structures.

It is furthermore preferred in the process according to the invention that the treated absorbing polymer structure (Pb) exhibits at least one of the following properties:
(A) the maximum absorption of a 0.9 wt. % aqueous NaCl solution according to ERT 440.1-99 is in a range from 10 to 800 ml/g, preferably 15 to 400 ml/g and particularly preferably 20 to 200 ml/g,
(B) the fraction that can be extracted with a 0.9 wt. % aqueous NaCl solution according to ERT 470.1-99 is less than 30 wt. %, preferably less than 20 wt. % and particularly preferably less than 10 wt. %, referred to the treated absorbing polymer structure (Pb),
(C) the swelling time to achieve 80% of the maximum absorption of a 0.9 wt. % aqueous NaCl solution according to ERT 440.1-99 is in the range from 0.01 to 180, preferably 0.01 to 150 and particularly preferably 0.01 to 100 minutes,
(D) the bulk density according to ERT 460.1-99 is in the range from 300 to 1000 g/l, preferably 310 to 800 g/l and particularly preferably 320 to 700 g/l,
(E) the pH value according to ERT 400.1-99 of 1 g of the untreated absorbing polymer structure in 1 liter of water is in the range from 4 to 10, preferably 5 to 9, and particularly preferably 5.5 to 7.5,
(F) the CRC according to ERT 441.1-99 is in the range from 10 to 100 g/g, preferably 15 to 80 g/g, and particularly preferably 20 to 60 g/g,
(G) the gel stability is in the region of at least 400 sec. at a first measurement before a warming-up and at least 80 sec. at a second measurement after the warming-up, preferably at least 500 sec. at the first measurement before the warming-up and at least 200 sec. at the second measurement after the warming-up, and particularly preferably at least 600 sec. at the first measurement before the warming-up and at least 300 sec. at the second measurement after the warming-up,
(H) the penetration is at least 10 cm after 2 hours or at least 20 cm after 24 hours, preferably at least 15 cm after 2 hours or at least 25 cm after 24 hours, and particularly preferably at least 20 cm after 2 hours or at least 30 cm after 24 hours, the penetration after 2 hours and after 24 hours being preferred.

The property combinations of two or more of the aforementioned properties represent in each case preferred embodiments of the process according to the invention. Furthermore, particularly preferred as embodiments according to the invention are processes in which the treated absorbing polymer structure (Pb) exhibits the properties or property combinations identified hereinafter by letters or combinations of letters: A, B, C, D, E, F, G, H, AB, ABC, ABCD, ABCDE, ABCDEF, ABCDEFG, ABCDEFGH, BC, BCD, BCDE, BCDEF, BCDEFG, BCDEFGH, CD, CDE, CDEF, CDEFG, CDEFGH, DE, DEF, DEFG, DEFGH, EF, EFG, EFGH, FG, FGH, GH, wherein all combinations with G are preferred, and those with G and H are particularly preferred.

Furthermore it is preferred in an embodiment of the process according to the invention that the AUL value at a load of 0.3 or 0.9 psi on the untreated absorbing polymer structure (Pu) is raised by at least 1 g/g, preferably at least 7 g/g and particularly preferably at least 15 g/g by the first treatment of the outer region of the untreated absorbing polymer structure (Pu).

Furthermore it is preferred in an embodiment of the process according to the invention that the AUL value at a load of 0.3 and 0.9 psi on the untreated absorbing polymer structure (Pu) is raised by at least 1 g/g, preferably at least 7 g/g and particularly preferably at least 15 g/g by the first treatment of the outer region of the untreated absorbing polymer structure (Pu).

Moreover it is preferred in an embodiment of the process according to the invention that the AUL value at a load of 0.3 psi on the untreated absorbing polymer structure (Pu) is raised to at least 20 g/g, preferably at least 25 g/g and particularly preferably 30 g/g by the first treatment of the outer region of the untreated absorbing polymer structure (Pu). The AUL at a load of 0.3 psi is preferably a maximum of 50 g/g and particularly preferably a maximum of 40 g/g.

It is also preferred in an embodiment of the process according to the invention that the AUL at a load of 0.9 psi on the untreated absorbing polymer structure (Pu) is raised to at least 10 g/g, preferably at least 15 g/g and particularly preferably at least 20 g/g by the first treatment of the outer region of the untreated absorbing polymer structure (Pu). The AUL at a load of 0.9 psi is preferably a maximum of 40 g/g and particularly preferably a maximum of 30 g/g.

According to one embodiment, in the step of the process according to the invention in which the treated absorbing polymer structure (Pb) is subjected to the second treatment of the outer region of the treated absorbing polymer structure (Pb), it is preferred that the AUL at a load of 0.3 or 0.9 psi is reduced in each case by at least 1 g/g, preferably by at least 2 g/g and particularly preferably by at least 4 g/g.

According to a further embodiment, in the step of the process according to the invention in which the treated absorbing polymer structure (Pb) is subjected to the second treatment of the outer region of the treated absorbing polymer structure (Pb), it is preferred that the AUL at a load of 0.3 and 0.9 psi is reduced in each case by at least 1 g/g, preferably by at least 2 g/g and particularly preferably by at least 4 g/g.

It is furthermore preferred according to the invention that in the second treatment of the outer region of the treated polymer structure (Pb), either the outer region is exposed to a source of energy or the second treatment is carried out by bringing the treated absorbing polymer structure (Pb) into contact with a coating agent, in which connection it is preferred to bring the treated absorbing polymer structure (Pb) into contact with a coating agent.

It is furthermore preferred that the treated absorbing polymer structure (Pb) is brought into contact, within the scope of the second treatment, with the coating agent in a concentration in a range from 0.001 to 40 wt. %, preferably 0.01 to 20 wt. %, more preferably 0.1 to 10 wt. % and particularly preferably 1 to 5 wt. %, referred to the treated absorbing polymer structure (Pb).

In a further embodiment of the second treatment the outer region of the treated polymer structure is first of all exposed to a source of energy and is then brought into contact with a coating agent.

In another embodiment of the second treatment the outer region of the treated polymer structure is first of all brought into contact with a coating agent and the polymer structure is then exposed to a source of energy.

The source of energy employed in the second treatment is preferably mechanical energy or radiation or both, radiation being preferred.

Mechanical energy is employed in the second treatment preferably in the form of pressure, such as is exerted particularly in grinding, extrusion, compaction and compression, preferably in compaction and compression, and particularly preferably in compaction. The pressure employed in the second treatment is preferably in a range from 0.1 to 100 tonnes/cm$^2$, preferably 0.5 to 10 tonnes/cm$^2$ and particularly preferably 1 to 5 tonnes/cm$^2$.

IR radiation, UV radiation, X-rays and γ-rays as well as microwaves are preferably used as radiation.

Furthermore in the process according to the invention it is preferred that the treated absorbing polymer structure (Pb) is brought into contact with a wetting agent in addition to the coating agent. In this connection it is particularly preferred that the treated absorbing polymer (Pb) is first of all brought into contact with the coating agent and then with the wetting agent.

In this connection it is preferred that the treated absorbing polymer structure (Pb) is brought into contact with the wetting agent in a range from 0.001 to 40 wt. %, preferably 0.01 to 20 wt. %, more preferably 0.1 to 10 wt. % and particularly preferably 1 to 5 wt. %, referred to the treated absorbing polymer structure (Pb).

In the process according to the invention it is furthermore preferred that the coating agent has an organic constituent and an inorganic constituent. The coating agent is preferably present as coating agent particles, in which connection it is preferred that the particles are smaller than the structure. Preferably at least 50 wt. % of the coating agent particles have a size in the range from 0.05 to 800 µm, preferably 0.05 to 600 µm, particularly preferably 0.05 to 400 µm and most particularly preferably 0.1 to 200 µm.

Furthermore, it is preferred in the process according to the invention that the organic constituent is a polymer (Ps). It is preferred that this polymer (Ps) in the form of a 4 wt. % solution in deionized water has a viscosity at 20° C. in the range from 1 to 100,000, preferably 10 to 50,000 and particularly preferably 100 to 10,000 mpa·s.

Preferably the polymer (Ps) is a polyvinyl alcohol, a polyethylene glycol, a polyvinylpyrrolidone, a polyglycerol, a gelatin, a cationic or anionic linear polymer or a saccharide-based polymer. The following compounds may be mentioned by way of example: xanthene, starches, guarken flour, citosan, alginate, dextrin, agar-agar, carrageen, traganth, gum arabic, alginates, pectins, polyoses, guar flour, carob bean flour or polyacrylic compounds, polymethacrylic compounds, vinyl polymers, polycarboxylic acids, polyethers, polyamines, or polyamides.

According to an embodiment of the process according to the invention it is preferred if the polymer (Ps) is based on a saccharide. Particularly preferred are derivatized saccharides such as esters, ethers and carboxymethylated derivatives. The ethers of the saccharides are preferably derivatised saccharides with $C_1$ to $C_{1000000}$, preferably $C_1$ to $C_{10000}$ and particularly preferably $C_1$ to $C_{10}$ alkyl groups. Of these, the derivatized saccharides with methyl, ethyl, propyl or butyl groups are preferred, derivatized saccharide with methyl groups being particularly preferred. Examples of esters of saccharides are acetates, acetobutyrates, acetopropionates or propionates. The polymer (Ps) preferably consists in an amount of at least 10 wt. %, more preferably at least 50 wt. % and particularly preferably at least 90 wt. %, referred to the polymer (Ps), of a saccharide or polysaccharide. Among the polysaccharides, cellulose and starch are preferred, cellulose being particularly preferred. It is furthermore preferred that the celluloses are present as carboxymethylcellulose, sodium and potassium carboxymethylcelluloses being preferred and sodium carboxymethylcellulose being particularly preferred.

In the process according to the invention it is furthermore preferred that the inorganic constituent is a solid that exhibits at least one of the following properties:

(α) a BET surface according to DIN 66131 of at least 10 m$^2$/g, preferably at least 50 m$^2$/g, more preferably at least 200 m$^2$/g and particularly preferably in the range from 180 to 1000 m$^2$/g, (β) a pH value in a 4% aqueous dispersion in the range from 2 to 11, preferably 2.5 to 8 and particularly preferably 3 to 5, (γ) a compacted bulk density according to DIN 787/XI and JIS K 5101/18 (not screened) of less than 800 g/l, preferably less than 300 g/l and particularly preferably less than 60 g/l.

The property combinations of two or more of the aforementioned properties represent in each case preferred embodiments of the process according to the invention.

Furthermore, particularly preferred as embodiments of the invention are processes in which the inorganic constituent exhibits the properties or combinations of properties identified hereinafter by letter or combinations of letters: α, β, γ, αβ αβγ, βγ or αγ, αβγ being particularly preferred.

Furthermore, in the process according to the invention it is preferred that the inorganic constituent is based on a silicon compound, all silicon-oxygen compounds known to the person skilled in the art, for example silicic acids and kaolins, being preferred, in which connection silicic acids are particularly preferred.

It is furthermore preferred that the treated absorbing polymer structure (Pb) is brought into contact with the inorganic coating agent in a concentration in the range from 0.001 to 40 wt. %, preferably 0.01 to 20 wt. % and particularly preferably 0.05 to 5 wt. %, referred to the treated absorbing polymer structure (Pb).

The treated absorbing polymer structure (Pb) is preferably brought into contact with the coating agent by mixing the treated absorbing polymer structure (Pb) with the said coating agent. If the coating agent consists of both an inorganic and organic constituent, it is preferred that the inorganic and organic constituents have been mixed together before they are brought into contact with the treated absorbing polymer structure. All mixing devices known to the person skilled in the art may be used for this purpose.

As wetting agents there may be used all inorganic or organic liquids known to the person skilled in the art, inorganic liquids being preferred. Among inorganic liquids water is particularly preferred.

The wetting agent is preferably either added during the mixing of the treated absorbing polymer structure (Pb) with the coating agent, or the product resulting from the mixing of the treated absorbing polymer structure (Pb) and coating agent is sprayed on.

Furthermore the invention relates to an absorbing polymer structure (Pa) that can be obtained by the aforedescribed process according to the invention.

In addition the invention relates to an absorbing polymer structure (Pa) having at least one of the following properties:

($\beta$1) a CRC of at least 10 g/g, preferably at least 15 g/g, more preferably at least 20 g/g and particularly preferably at least 25 g/g, ($\beta$2) an AUL at a load of 0.3 psi of at least 15 g/g, preferably at least 20 g/g, ($\beta$3) an AUL at a load of 0.9 psi of at least 8 g/g, preferably at least 12 g/g, ($\beta$4) a gel stability in the region of at least 100 sec. after a first measurement before a warming-up and at least 15 sec. at the second measurement after the warming-up, preferably at least 200 sec. at the first measurement before the warming-up and at least 20 sec. at the second measurement after the warming-up, and particularly preferably at least 300 sec. at the first measurement before the warming-up and at least 30 sec. at the second measurement after the warming-up, ($\beta$5) a penetration of at most 15 cm after 2 hours or at most 20 cm after 24 hours, preferably at most 10 cm after 2 hours or at most 15 cm after 24 hours, and particularly preferably at most 6 cm after 24 hours or at most 8 cm after 24 hours, penetrations after 2 hours and 24 hours being preferred, or ($\beta$6) a swelling pressure of at least 400 g, preferably at least 500 g, more preferably at least 600 g and particularly preferably 800 g, containing an inner region, an outer region surrounding the inner region, as well as a surface region surrounding the outer region, the outer region having a higher degree of crosslinking than the inner region and the surface region containing a coating agent.

The property combinations resulting from two or more of the aforementioned properties represent in each case preferred embodiments of the absorbing polymer structure (Pa) according to the invention. Furthermore, a particularly preferred embodiment according to the invention is an absorbing polymer structure that exhibits the properties or combinations of properties identified hereinafter by letters or combinations of letters: $\beta$1, $\beta$2, $\beta$3, $\beta$4, $\beta$5, $\beta$6, $\beta$1$\beta$2, $\beta$1$\beta$2$\beta$3, $\beta$1$\beta$2$\beta$3$\beta$4, $\beta$1$\beta$2$\beta$3$\beta$4$\beta$5, $\beta$1$\beta$2$\beta$3$\beta$4$\beta$5$\beta$6, $\beta$2$\beta$3, $\beta$2$\beta$3$\beta$4, $\beta$2$\beta$3$\beta$4$\beta$5, $\beta$2$\beta$3$\beta$4$\beta$5$\beta$6, $\beta$3$\beta$4, $\beta$3$\beta$4$\beta$5, $\beta$3$\beta$4$\beta$5$\beta$6, $\beta$4$\beta$5, $\beta$4$\beta$5$\beta$6, wherein $\beta$1$\beta$2$\beta$3$\beta$4$\beta$5$\beta$6 is particularly preferred.

One embodiment of the invention forms an absorbing polymer structure (Pa) with an AUL at a load of 0.3 psi of less than 27 g/g and a swelling pressure of at least 400 g, preferably of at least 500 g, more preferably of at least 600 g and particularly preferably of at least 800 g. In this embodiment an absorbing polymer structure (Pa) is preferred with an AUL at a load of 0.3 psi in the range from 1 to 27 g/g, preferably 10 to 27 g/g, and a swelling pressure in the range from 500 to 3000 g, preferably 600 to 2800 g, more preferably in the range from 700 to 2600 g, and particularly preferably in the range from 800 to 2400 g. Furthermore it is preferred according to the invention that the absorbing polymer structure (Pa) of this embodiment includes an inner region, an outer region surrounding the inner region, as well as a surface region surrounding the outer region, the outer region having a higher degree of crosslinking than the inner region and the surface region containing a coating agent. It is furthermore preferred according to the invention that the aforementioned features also apply to the absorbing polymer that can be obtained by the process according to the invention.

The invention furthermore relates to a composite containing an absorbing polymer structure (Pa) defined hereinbefore and a substrate. It is preferred that the absorbing polymer structure (Pa) according to the invention and the substrate are firmly combined with one another. Preferred substrates include films formed from polymers, for example from polyethylene, polypropylene or polyamide, metals, non-wovens, fluff, tissues, woven fabrics, natural or synthetic fibres, or other foams.

According to the invention preferred composites are sealing materials, cables, absorbing cores as well as diapers and hygiene articles containing the latter.

The sealing materials are preferably water-absorbing films, wherein the absorbing polymer structure (Pa) is incorporated in a polymer matrix or fiber matrix as substrate. This is preferably carried out by mixing the absorbing polymer structure (Pa) with a polymer (Pm) forming the polymer matrix or fiber matrix, and then forming a composite, optionally by thermal treatment. In the case where the absorbing structure is employed as fibers, yarns may be obtained therefrom which are spun as a substrate with further fibers consisting of another material, and are then combined with one another, for example by weaving or knitting, or are combined directly, i.e. without having to be spun with further fibres. Typical processes suitable for this purpose are described by H. Savano et al., International Wire & Cable Symposium Proceedings 40,333 to 338 (1991); M. Fukuma et al., International Wire & Cable Symposium Proceedings 36,350 to 355 (1987) and in U.S. Pat. No. 4,703,132. These disclosures are introduced here by way of reference and are thus part of the disclosure.

In the embodiment in which the composite is a cable, the absorbing polymer structure (Pa) may be used directly as particles, preferably underneath the insulation of the cable. In another embodiment of the cable the absorbing polymer structure (Pa) may be used in the form of swellable, high tensile strength yarns. According to another embodiment of the cable the absorbing polymer structure (Pa) may be used in the form of a swellable film. Furthermore, in yet another embodiment of the cable the absorbing polymer structure (Pa) may be used as a moisture-absorbing core in the center of the cable. In the case of the cable, the substrate forms all the constituents of the cable that do not contain absorbing polymer structure (Pa). These include the conductors incorporated in the cable, such as electrical leads or light conductors, optical and/or electrical insulating materials, as well as constituents of the cable that ensure the mechanical integrity of the cable, such as plaited, woven or knitted materials of high tensile strength, such as plastics and insulating materials of rubber or other materials that prevent the destruction of the outer sheathing of the cable.

If the composite is an absorbing core, the absorbing polymer structure (Pa) is incorporated into a substrate. Suitable substrates for cores are preferably fibrous materials consisting predominantly of cellulose. In an embodiment of the core the absorbing polymer structure (Pa) is incorporated in an amount in the range from 10 to 90 wt. %, preferably 20 to 80 wt. % and particularly preferably 40 to 70 wt. %, referred to the core. In yet another embodiment of the core the absorbing polymer structure (Pa) is incorporated as particles into the core. In a further embodiment of the core the absorbing polymer structure (Pa) is incorporated as fibers into the core. The core may be produced for example by a so-called airlaid process or by a so-called wetlaid process, a core produced according to the airlaid process being preferred. In the wetlaid process the fibers or particles of absorbing polymer structure are processed together with further substrate fibers and a liquid to form a non-woven. In the airlaid process the fibers or particles of absorbing polymer structure and the substrate fibers are processed in the dry state into a non-woven. Further details of the airlaid process are described in U.S. Pat. No. 5,916,670 as well as U.S. Pat. No. 5,866,242, and of the wetlaid process are described in U.S. Pat. No. 5,300,192, whose disclosure is introduced here by way of reference and is thus part of the disclosure.

In the wetlaid and airlaid processes, in addition to the absorbing polymer fibers or particles and the substrate fibers, there may also be used further suitable auxiliary substances known to the person skilled in the art that contribute to the strengthening of the non-woven obtained by this process.

In the embodiment in which the composite is a diaper, the constituents of the diaper that are different from the absorbing polymer structure (Pa) constitute the substrate of the composite. In a preferred embodiment the diaper contains a core described hereinbefore. In this case the constituents of the diaper different from the core constitute the substrate of the composite. In general a composite used as a diaper includes a water-impermeable under layer, a water-permeable, preferably hydrophobic upper layer, and a layer containing the absorbing polymer structure (Pa) that is arranged between the under layer and the upper layer. This layer containing the absorbing polymer structure (Pa) is preferably a core described hereinbefore. The under layer may comprise all materials known to the person skilled in the art, polyethylene or polypropylene being preferred.

The upper layer may likewise contain all suitable materials known to the person skilled in the art, polyesters, polyolefins, viscose and the like being preferred, which produce a layer that is sufficiently porous so as to ensure a satisfactory flow of liquid through the upper layer. In this connection reference may be made to the disclosures in U.S. Pat. No. 5,061,295, U.S. Re. Pat. No. 26,151, U.S. Pat. No. 3,592,194, U.S. Pat. No. 3,489,148 as well as U.S. Pat. No. 3,860,003. These disclosures are introduced here by way of reference and are thus part of the disclosure.

The invention furthermore relates to a process for the production of a composite, in which an absorbing polymer structure according to the invention and a substrate and optionally a suitable auxiliary substance are brought into contact with one another. The components are preferably brought into contact by wetlaid and airlaid processes, compaction, extrusion and mixing.

The invention moreover relates to a composite that can be obtained by the aforedescribed process.

In addition the invention relates to foams, moulded articles, fibers, sheets, films, cables, sealing materials, liquid-absorbing hygiene articles, carriers for plant growth-regulating and fungal growth-regulating agents, additives for building materials, packaging materials and soil additives that contain the absorbing polymer structure (Pa) according to the invention or the aforedescribed composite.

Moreover the invention relates to the use of the absorbing polymer structure (Pa) according to the invention or the aforedescribed composite in foams, moulded articles, fibers, sheets, films, cables, sealing materials, liquid-absorbing hygiene articles, carriers for plant growth-regulating and fungal growth-regulating agents, additives for building materials, packaging materials, for the controlled release of active constituents, or in soil additives.

The invention will now be described in more detail hereinafter with the aid of non-limiting examples.

EXAMPLES

Powder 1 (Not Post-crosslinked):

290 g of acrylic acid were divided into two portions. One portion was added to 458.5 g of $H_2O$. 0.90 g of triallylamine and 0.87 g of allyloxy polyethylene glycol acrylic acid ester were dissolved in the second portion of acrylic acid and also added to the water. The solution was cooled to 10° C. A total of 225.4 g of 50% sodium hydroxide solution were next added at such a rate while cooling that the temperature did not rise above 30° C. The solution was then flushed at 20° C. with nitrogen and cooled further. When the starting temperature of 4° C. had been reached the initiator solutions (0.1 g of 2,2-azobis-2-amidinopropane dihydrochloride in 10 g $H_2O$, 1.0 g of sodium peroxodisulfate in 10 g $H_2O$, 0.1 g of 30% hydrogen peroxide solution in 1 g $H_2O$ and 0.015 g of ascorbic acid in 2 g water) were then added. After the end temperature of ca. 100° C. had been reached, the resultant gel was comminuted and dried at 150° C. for 90 minutes. The dried powder was coarsely triturated, ground and screened to form a powder having a particle size of between 150 and 850 μm.

Powder 2 (Post-crosslinked):

A mixture of 0.5 g of ethylene carbonate, 1.0 g of $H_2O$ and 4.0 g of acetone was added while stirring to 50 g of the powder 1. The product was added to a developing dish and dried for 50 minutes at 170° C. in a circulating air dryer.

Powder 3 (Organic Coating Agent):

50 g of powder 2 were combined with 1 g of sodium carboxymethylcellulose powder in a mixer equipped with stirrer blades, to form a mixture. This mixture was then sprayed with 1.5 g of water and stirred for a further 5 minutes.

Powder 4 (Organic and Inorganic Coating Agents):

50 g of powder 2 were combined with 1 g of carboxymethylcellulose powder and 0.1 g of Aerosil® from Degussa AG in a mixer equipped with stirrer blades, to form a mixture. This mixture was then sprayed with 1.5 g of water and stirred for a further 5 minutes.

Powder 5 (Slightly Crosslinked):

300 g of acrylic acid were divided into two portions. One portion was added to 376.4 g of $H_2O$:0.90 g of triallylamine and 1.5 g of allyloxy polyethylene glycol acrylic acid ester were dissolved in the second portion of acrylic acid and also added to the water. The solution was cooled to 10° C. A total of 283.1 g of 50% sodium hydroxide were next added at such a rate while cooling that the temperature did not rise above 30° C. The solution was then flushed at 20° C. with nitrogen and cooled further. When the starting temperature of 4° C. had been reached the initiator solution (0.1 g of 2,2'-azobis-2-amidinopropane dihydro-chloride in 10 g $H_2O$, 1.0 g of sodium peroxodisulfate in 10 g $H_2O$, 0.1 g of 30% hydrogen peroxide solution in 1 g $H_2O$ and 0.015 g of ascorbic acid in 2 g water) was then added. After the end temperature had been reached, the resultant gel was comminuted and dried at 150° C. for 90 minutes. The dried powder was coarsely triturated, ground and screened to form a powder having a particle size of between 150 and 850 µm. 50 g of the powder was sprayed with a solution of 1.5 g of ethylene carbonate in 1 g of $H_2O$ and dried in a circulating air cabinet for 35 minutes at 190° C.

The results of various test investigations carried out on powders 1 to 5 are shown in the following Table 1:

TABLE 1

|  | Powder 1 | Powder 2 | Powder 3 according to the invention | Powder 4 according to the invention | Powder 5 |
|---|---|---|---|---|---|
| CRC [g/g] | 40 | 31.4 | 31.1 | 31 | 30.7 |
| Swelling Pressure [g] | 250 | 800 | 780 | 815 | 375 |
| AUL 0.3 [g/g] | 14.1 | 31.6 | 26.9 | 26.4 | 26.7 |
| AUL 0.9 [g/g] | 7.8 | 23.1 | 16.8 | 16.2 | 10.9 |
| Gel Stability |  |  |  |  |  |
| 1$^{st}$ Measurement | 15 | >600 | 415 | 300 | 114 |
| 2$^{nd}$ Measurement | <4 | 548 | 64 | 34 | <4 |
| Penetration |  |  |  |  |  |
| 0 min. | 2 | 28 | 5 | 5 | 1 |
| 30 min. | 3 | 30 | 5 | 7 | 3 |
| 1 hr. | 4 | 30 | 6 | 7 | 3 |
| 2 hrs. | 5 | 30 | 10 | 8 | 5 |
| 24 hrs. | 13 | 40 | 15 | 8 | 16 |

The powders were processed into cores and exhibit the properties according to Table 2.

TABLE 2

|  | Airlaid 1, Powder 2 | Airlaid 2, Powder 3 | Airlaid 3, Powder 5 |
|---|---|---|---|
| 1$^{st}$ Soak-up Time[s] | 50 | 28 | 45 |
| 2$^{nd}$ Soak-up Time[s] | 111 | 240 | 147 |
| 3$^{rd}$ Soak-up Time[s] | 191 | 542 | 307 |
| 1$^{st}$ Liquid Distribution [mm] | 160 | 137 | 147 |
| 2$^{nd}$ Liquid Distribution [mm] | 170 | 140 | 153 |
| 3$^{rd}$ Liquid Distribution [mm] | 213 | 190 | 203 |

Production of Cores and Diapers

The cores were produced by mixing 50 wt. % of an absorbing polymer structure (powder 2, 3 or 5), referred to the core, and 47.5 wt. % of Stora Fluff EF cellulose fibers from Stora-Enzo AB Sweden, as well as 2.5 wt. % of a two-component fiber of in each case 50 wt. % of polypropylene (PP) or polyethylene (PE) with a PP core and PE coating from Fibervision A/S Denmark, by an airlaid process using a M&J machine (width 40 cm, operating width 36 cm, belt speed 4 m/min, fluff take-in on a hammer mill at a speed of 4 m/min, polymer added at a rate of 430 g/min, two-component fiber discharged in 10 g portions 2.1 times per minute), the absorbing polymer being homogeneously distributed. Cores with a base weight of 600 g/cm² without tissue and 636 g/cm² with tissue, a density of 0.16 to 0.17 g/cm³ and size of 30×12 cm were incorporated into a commercially available Fixies diaper framework from Paul Harmann AG, Recklinghausen. The rearside of the diaper framework was then cut out, the original core was removed and replaced by the core according to the invention, and the cut section was sealed by a fabric adhesive strip. The soak-up times and liquid distribution values of the resultant diapers were measured; the values being shown in Table 3.

TABLE 3

| Diaper with cores with | Soak-up Time Additions | | | Liquid Distribution Additions | | |
|---|---|---|---|---|---|---|
|  | 1$^{st}$ [sec] | 2$^{nd}$ [sec.] | 3$^{rd}$ [sec.] | 1$^{st}$ [mm.] | 2$^{nd}$ [mm.] | 3$^{rd}$ [mm.] |
| Powder 3 (according to the invention) | 45 | 147 | 307 | 147 | 153 | 203 |
| Powder 5 (comparison) | 38 | 240 | 542 | 137 | 140 | 190 |

Shorter soak-up times and liquid distribution over a larger section of a diaper point to a lower blocking effect in hygiene articles. From Table 3 it is clear that the powder 3 according to the invention in a diaper core soaks up liquid significantly more quickly than a core with powder 5 in a diaper, especially as regards the second and third additions that are critical for diapers.

Furthermore, the measurement of the liquid distribution also shows that the diaper with the core containing powder 3 transports the liquid over a substantially longer section than the comparison diaper with a core containing powder 5.

Test Methods

ERT

ERT stands for "EDANA Recommended Test". These tests involve methods that the members of EDANA (European Diaper and Nonwoven Association) have approved and that are available to the public through EDANA.

Absorption Under Load (AUL) at a Load of 0.9 PSI 0.16±0.01 g ($W_1$) of Superabsorber granules of grain size between 300 and 600 µm were weighed out into a Plexiglass cylinder of internal diameter 26.1±0.03 mm and a floor of metal sieving fabric with a mesh width of 400×400 mesh. The grain sizes were obtained by screening through a sieve of mesh width 300 and 600 µm. A small Teflon plate of external diameter 26.1±0.03 mm was laid on the Superabsorber granules. A weight of 332.4±0.1 g was placed on the plate. The weight of the plate and the weight placed thereon together exerted a pressure of 63 g/cm² on the Superabsorber granules. The measurement apparatus was weighed ($W_2$). The measurement apparatus was then placed on a glass filter plate (diameter 125 mm, porosity=C (25–50 µm) that was covered with a filter paper and was arranged in a glass dish. The glass dish was filled with 0.9% NaCl solution up to the upper edge of the glass filter plate. Due to contact with the liquid the Superabsorber soaked up the latter and began to swell. After 1 hour the complete measurement apparatus was removed from the filter plate and reweighed ($W_3$). The AUL 0.9 psi is expressed in g/g and is calculated from the following formula:

$$AUL\ 0.9\ psi = \frac{W_3 - W_2}{W_1}$$

Absorption Under Load (AUL) at a Load of 0.3 PSI 0.16±0.01 g ($W_1$) of Superabsorber granules of grain size between 300 and 600 µm were weighed out into a Plexiglass cylinder of internal diameter 26.1±0.03 mm and a floor of metal sieving fabric with a mesh width of 400×400 mesh. The grain sizes were obtained by screening through a sieve of mesh width 300 and 600 μm. A small Teflon plate of external diameter 26.1±0.03 mm was laid on the Superabsorber granules. A weight of 102.3±0.1 g was placed on the plate. The weight of the plate and the weight placed thereon together exerted a pressure of 20 g/cm² on the Superabsorber granules. The measurement apparatus was weighed ($W_2$). The measurement apparatus was then placed on a glass filter plate (diameter 125 mm, porosity=C (25–50 μm) that was covered with a filter paper and was arranged in a glass dish. The glass dish was filled with 0.9% NaCl solution up to the upper edge of the glass filter plate. Due to contact with the liquid the Superabsorber soaked up the latter and began to swell. After 1 hour the complete measurement apparatus was removed from the filter plate and reweighed ($W_3$). The AUL 0.3 psi is expressed in g/g and is calculated from the following formula:

$$AUL\ 0.3\ psi = \frac{W_3 - W_2}{W_1}$$

Penetration Test

This test was carried out using an apparatus. This apparatus consisted of a glass tube 1 of internal diameter 8 mm and length 310 mm sealed with a cotton wool plug 2. The absorbing material to be investigated was packed into the tube to a length of 300 mm and compacted by tapping the tube 10 times. Extra absorbing material was then added so that the 300 mm filling height was restored. The tube 1 was then connected to a reservoir 3 via a plastics hose 4. The liquid level of the reservoir 3 was 1 m above the horizontally arranged tube 1 in order thereby to apply a liquid pressure of 0.1 bar on the tube. The stopcock 5 was next opened so that the test solution could flow into the tube 1 filled with absorbing material. The length over which the test solution penetrated into the tube 1 filled with absorbing material was then measured at the times specified in the preceding Table.

Gel Stability Test

The apparatus illustrated used for the gel stability test consisted of a plastics cylinder 6 of length 40 cm and diameter 30 mm. The plastics cylinder 6 was sealed with a rubber stopper 7. The cylinder 6 was fixed in a stand 8 at an angle of 10°. A steel ball 9 of diameter 26.2 mm and weighing 73.3 g was used to measure the movement through the absorbing material. The maximum absorption of the superabsorbent polymer (SAP) in deionized water was first of all measured. For this purpose 0.200±0.005 g SAP (weighed amount $W_1$) was weighed out in a heat-sealable teabag of Dexter paper (grade 7291) (12×8.5 cm) that had been folded once and had been sealed on one side. In each case a triple determination (teabag with SAP) and a double determination for the blank sample test (teabag without SAP) were carried out. The open side of the teabag was sealed using a domestic welding device (ca. 3–5 mm from the edge). If the time between the weighing-out and measurement was longer than 5 minutes, the teabag was placed in a sealed vessel. The blank samples (teabag without SAP) were prepared in a similar manner. A plastics dish was filled with deionized water. The liquid level should be about 4 cm high. If the solution was used for further tests, the liquid level had to be checked in each case. If necessary the dish was replenished with liquid. After a maximum of 10 dipped teabags per liter of test liquid, the solution was renewed. The prepared teabags were held horizontally and the SAP was distributed uniformly in the teabag by gently shaking. The teabags (with and without SAP) were placed on the surface of the test solution and briefly immersed so that they were completely wetted with liquid. The stopwatch was started at the same time. After 30 minutes the teabags were removed and suspended for 10 minutes to allow the liquid to drip at the edges. The teabags without Superabsorber ($W_2$) and the teabags with Superabsorber ($W_3$) were then weighed. (Weighing accuracy: 0.01 g). The absorption (A) was calculated according to the formula $$A = \frac{W_3 - W_2 - W_1}{W_1}$$

and is expressed in g liquid per g SAP. The amount of Superabsorber required to absorb 500 g of deionized water was calculated accordingly and weighed out into a small weighing boat. 500 g of water are weighed out into a 600 ml beaker. The solution is stirred at 300 r.p.m. with a stirrer blade. The Superabsorber is sprinkled into the liquid as quickly as possible. A blocking effect during the sprinkling process is avoided by increasing the magnetic stirrer setting to 700 r.p.m. during the addition of the SAP, until all the SAP has been sprinkled in. The speed is then reduced to 300 r.p.m. and the stopwatch is started. The stirring time is 3 minutes. After switching off the stirrer the stopwatch is restarted. The gel is allowed to post-swell for 5 minutes. The plastics cylinder is then filled with the gel up to the 35 cm measurement mark. The first measurement is now carried out by letting the metal ball slide into the gel, and the time taken for the ball to pass from the 25 cm measurement mark to the 10 cm measurement mark is recorded. The same gel is transferred to a glass vessel with a screw cap, which is closed and kept for 16 hours at 80° C. in a drying cabinet and then cooled for 4 hours at room temperature (warming-up). The second measurement is then carried out as described above. Times over 600 sec. are recorded as >600 sec., and times below 4 sec. are recorded as <4 sec.

Soak-Up Time and Liquid Distribution

The composite was weighed, placed in the body-shaped test apparatus (depending on the intended use the composite was tested together with further materials) and subjected to a load. The loading is determined by the intended use of the composite to be tested.

Several identical amounts of liquids were then added using a measurement cylinder or forcibly by means of a pump, through the opening of the test apparatus. The soak-up time from the start of the test until the test liquid had been completely soaked up was measured by means of the stopwatch. Each addition of liquid was followed by a waiting time of 20 minutes. The weights were then removed. The leakage behaviour was evaluated visually throughout the whole experiment and/or was determined by back-weighing the liquid that had flowed out. The liquid distribution was determined in each case shortly before the addition of the next amount of liquid or before removing the composite from the test apparatus. For this purpose the spreading of the liquid in the composite was measured.

| Test parameters | | | |
|---|---|---|---|
| Test solution | 0.9% NaCl solution (5 ml/l of fuchsin acid) | | |
| Number of additions | 3 | Total amount added [g] | 180 |
| Kanga loading [kg] | 9 | Addition interval [min] | 20 |
| Pad length [cm] | 30 | Pad width [cm] | 12 |
| Rewet load [g/cm$^3$] | 20 | Rewet load time [min] | 10 |

Swelling Pressure

This procedure was used to evaluate how quickly a swelling body reaches its maximum swelling state and to determine the swelling pressure that is established in the test medium.

This method employed a Stevens L.F.R.A. texture analyzer, a measurement body 3.5 cm high and diameter 2.5 cm, a measuring cylinder 7.4 cm high and internal diameter 2.7 cm, a scales weighing to 0.01 g accuracy, a laboratory bench, an XYT recorder, a 10 ml capacity measuring cylinder as well as a 20 to 50 mesh sieve, US standard ASTM, and, as chemicals, distilled water of pH 6–7, ae less than or equal to 4 μs/cm as well as analysis purity NaCl from Merck, Article No. 6400.

0.500 g of the product of fractions 20 to 50 mesh were weighed out into the measuring cylinder and 10 ml of 0.9 wt. % aqueous NaCl solution were added. The cylinder was now raised using a laboratory bench to underneath the lower edge of the apparatus and fixed in place. The measurement was carried out with the following settings: speed 1.0 mm/sec, distance 0.0 and hold. The swelling pressure was read off in grams from the XYT recorder.

What is claimed is:

1. A process for making an absorbing polymer structure (Pa) comprising the following steps:
   preparing an absorbing polymer comprising the step of polymerizing
   (α1) 0.1 to 99.999 wt. % of polymerized, ethylenically unsaturated, acid group-containing monomers or their salts, or polymerized, ethylenically unsaturated monomers containing a protonated or quaternated nitrogen atom, or their mixtures; and
   (α2) 0.001 to 10 wt. % of a crossliniking agent,
   resulting in an untreated dried absorbing polymer structure (Pu) having an outer region and an absorption under load (AUL) at a load of 0.3 psi ($AUL_{0.3}$), and an absorption under load at a load of 0.9 psi ($AUL_{0.9}$), and having a centrifuge retention capacity (CRC) of from 10 to 100 g/g;
   preparing a treated absorbing polymer structure (Pb) comprising the steps of treating the outer region of the untreated absorbing polymer structure (Pu) wherein the ($AUL_{0.3}$) is increased to at least 25 g/g, and the ($AUL_{0.9}$) is increased to at least 18 g/g; and further treating the outer surface of the treated absorbing polymer structure (Pb) with a coating agent to reduce the ($AUL_{0.3}$), and the ($AUL_{0.9}$) values of the treated polymer structure (Pb).

2. The process according to claim 1, wherein the centrifuge retention capacity (CRC) of the treated absorbing polymer structure (Pb) is reduced less in percentage terms referred to the value before the contact, than the reduction in percentage terms in the value of the ($AUL_{0.3}$).

3. The process according to claim 1, wherein the-coating agent comprises an organic constituent and an inorganic constituent.

4. The process according to claim 1, wherein the untreated absorbing polymer structure (Pu) exhibits at least one of the following properties:
   (a) a maximum absorption of a 0.9 wt. % aqueous NaCl solution is in a range from 10 to 1000 ml/g,
   (b) a fraction that can be extracted with a 0.9 wt. % aqueous NaCl solution is less than 30 wt. % referred to the untreated absorbing polymer structure,
   (c) a swelling time to achieve 80% of the maximum absorption of a 0.9 wt. % aqueous NaCl solution is in the range from 0.01 to 180 minutes,
   (d) a bulk density is in the range from 300 to 1000 g/l,
   (e) a pH value of 1 g of the untreated absorbing polymer structure in 1 liter of water is in the range from 4 to 10,
   (f) a gel stability is in the range from 1 to 100 sec. at a first measurement before a warming-up, and less than 30 sec. at a second measurement after the warming-up, or
   (g) a penetration is at most 15 cm after 2 hours or at most 20 cm after 24 hours.

5. The process according to claim 1, wherein the treated absorbing polymer structure (Pb) exhibits at least one of the following properties:
   (A) a maximum absorption of a 0.9 wt. % aqueous NaCl solution is in a range from 10 to 800 ml/g,
   (B) a fraction that can be extracted with a 0.9 wt. % aqueous NaCl solution is less than 30 wt. % referred to the treated absorbing polymer structure,
   (C) a swelling time to achieve 80% of the maximum absorption of a 0.9 wt. % aqueous NaCl solution is in the range from 0.01 to 180 minutes,
   (D) a bulk density is in the range from 300 to 1000 g/l,
   (E) a pH value of 1 g of the treated absorbing polymer structure in 1 liter of water is in the range from 4 to 10,
   (F) a CRC is in the range from 10 to 100 g/g, or
   (G) a gel stability is in the region of at least 500 sec. at a first measurement before a warming-up and at least 80 sec. at a second measurement after the warming-up.

6. The process according to claim 3, comprising the step of contacting the treated absorbing polymer structure (Pb) with a wetting agent.

7. The process according to claim 6, wherein the treated absorbing polymer structure (Pb) is first brought into contact with the coating agent and then with the wetting agent.

8. The process according to claim 1, wherein the coating agent is a coating agent particle.

9. The process according to claim 8, wherein the coating agent particle is smaller than the polymer structure.

10. The process according to claim 3, wherein the organic constituent is selected from sodium carboxymethylcellulose and potassium carboxymethylcellulose and the inorganic constituent is a silicon compound.

11. The process according to claim 3, wherein the organic constituent is a polymer (Ps).

12. The process according to claim 11, wherein the polymer (Ps), in the form of a 4 wt. % solution in deionized water, has a viscosity at 20° C. in the range from 1 to 100,000 mPa·s.

13. The process according to claim 11, wherein the polymer (Ps) is a saccharide.

14. The process according to claim 3, wherein the inorganic constituent is a solid having at least one of the following properties:
   (α) a BET surface of at least 10 m$^2$/g,
   (β) a pH value in a 4% aqueous dispersion in the range from 2 to 9, or
   (γ) a compacted bulk density of less than 800 g/l.

15. The process according to claim 10, wherein the inorganic constituent is a silica compound.

16. The process according to claim 1, wherein the first treatment is carried out using a chemical crossliniking agent or by thermal crossliniking, or by both.

17. The process according to claim 1, wherein the treated, absorbing polymer structure (Pb) has an inner region surrounded by the outer region, and the outer region has a higher degree of crossliniking than the inner region.

18. The process according to claim 17, wherein the radius of the outer region is less than twice the radius of the inner region.

19. A process for making an absorbing polymer structure (Pa) comprising the steps of preparing an absorbing polymer comprising the steps of polymerizing (α1) from 30 wt. % to 98.95 wt. % of a monoethylenically unsaturated, acid containing monomer, or salts thereof; and (α2) 0.001 to 10 wt. % of a crossliniking agent, said absorbing polymer resulting in an untreated dried absorbing polymer structure (Pu) having an outer surface region and an absorption under load (AUL) at a load of 0.3 psi, ($AUL_{0.3}$), and an absorption under load at a load of 0.9 psi, ($AUL_{0.9}$), and having a centrifuge retention capacity (CRC) of from 10 to 100 g/g;

preparing a treated absorbing polymer structure (Pb) comprising the steps of treating the outer region of the untreated absorbing polymer structure (Pu) wherein the ($AUL_{0.3}$) is increased to 30g/g or more, and the ($AUL_{0.9}$) is increased to 18 g/g or more;

and further treating the outer surface of the treated absorbing polymer structure (Pb) with a coating agent comprising carboxymethylcellulose wherein the ($AUL_{0.3}$) of the treated absorbing polymer structure (Pb) is reduced to less than 30 g/g, and the ($AUL_{0.9}$) of the treated absorbing polymer structure (Pb) is reduced to less than 18 g/g.

20. The process according to claim 19, wherein the monoethylenically unsaturated, acid-containing monomer is acrylic acid.

21. The process according to claim 19, wherein the coating agent further comprises a silica compound.

* * * * *

UNITED STATES PATENT AND TRADEMARK OFFICE
CERTIFICATE OF CORRECTION

PATENT NO.         : 7,241,820 B2
APPLICATION NO. : 10/427054
DATED              : July 10, 2007
INVENTOR(S)        : Scott Smith et al.

It is certified that error appears in the above-identified patent and that said Letters Patent is hereby corrected as shown below:

Column 2, line 49: "yams" should read -- yarns --

Column 7, line 53: "class W" should read -- class IV --

Column 16, line 29: "yams" should read -- yarns--

Column 18, line 47: "Aerosil® from" should read -- Aerosil® 200 from --

Column 24, line 18: "afler" should read -- after --

Column 25, line 5: "crossliniking" should read -- crosslinking --

Column 25, line 9: "crossliniking" should read -- crosslinking --

Signed and Sealed this

Fourteenth Day of August, 2007

JON W. DUDAS
*Director of the United States Patent and Trademark Office*